Patented June 12, 1951

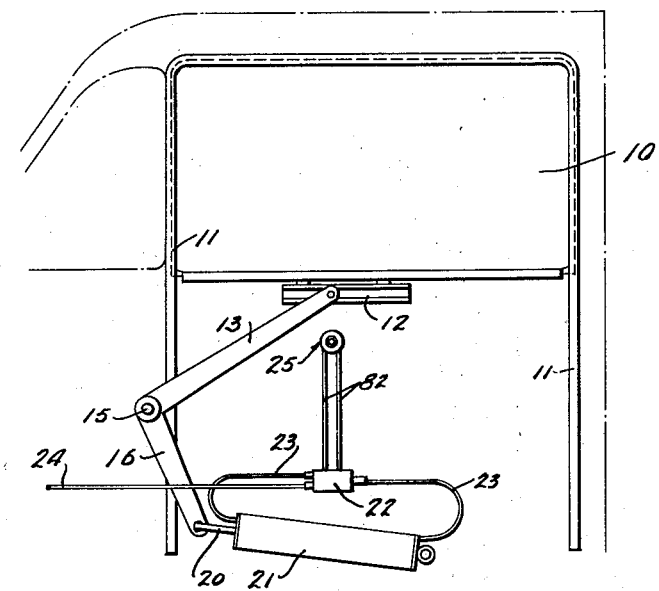
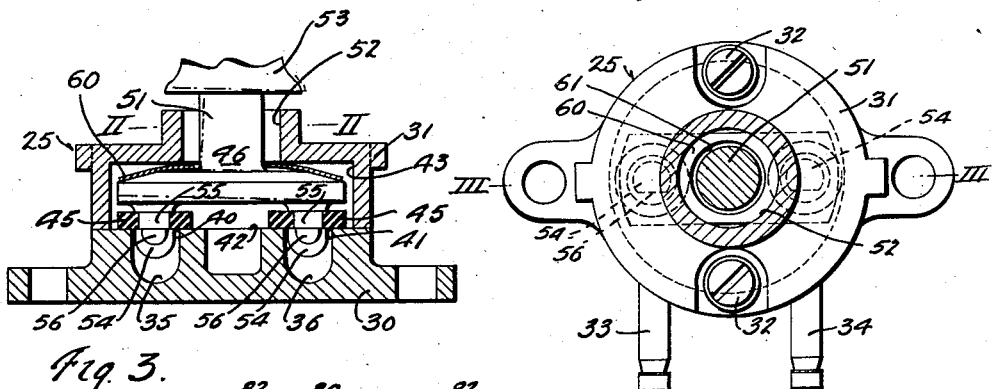
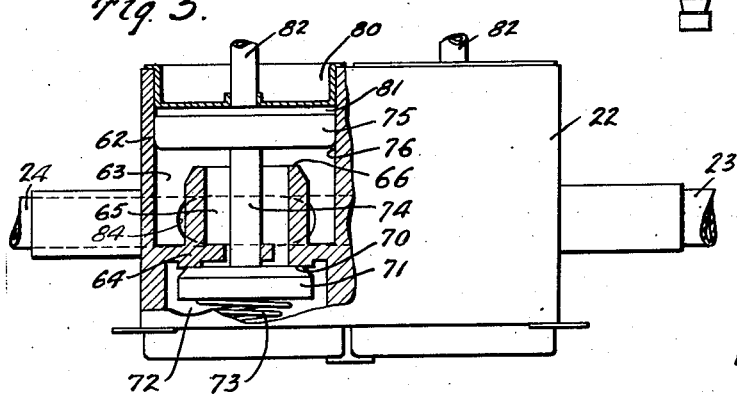

2,556,448

UNITED STATES PATENT OFFICE 2,556,448

WINDOW OPERATOR VALVE

Earl V. Schaal, East Aurora, N. Y., assignor to Trico Products Corporation, Buffalo, N. Y.

Application September 19, 1945, Serial No. 617,335

9 Claims. (Cl. 277—21)

This invention relates in general to fluid operated window systems, and particularly to the control operators of such systems. The invention has specific reference to selector valves for such operators, and is used in connection with a control operator similar to that shown and described in a prior Patent No. 2,439,863 granted April 20, 1948.

The present invention has for its principal object the provision of a unitary selector valve having a single control means oscillatable in either direction to cause the window to be raised or lowered, thereby reducing the number of parts necessary in a two-button structure, with a consequent lesser likelihood of getting out of order.

The invention further has for its object to provide a valve of economical but durable construction which is suited for volume production.

The above objects and advantages have been accomplished by the device shown in the accompanying drawings, of which:

Fig. 1 is a diagrammatic view of an automobile door equipped with the selector valve of the present invention and showing its connection to the associated operating parts;

Fig. 2 is an enlarged vertical sectional plan view taken on line II—II of Fig. 3;

Fig. 3 is a horizontal sectional view of the invention, taken on line III—III of Fig. 2; and Fig. 4 is a fragmentary sectional view of a motor operating unit of the type with which the invention is adapted to be used.

Referring to the drawings, and in particular to Fig. 1, the window panel of the automobile is represented at 10 and is slidable in suitable guideways 11. Along its lower edge is fixed a bracket 12 on which slides an arm 13 of a bell crank lever that is pivoted at 15; the power arm 16 of the lever being pivotally attached to the piston rod 20 of the fluid motor 21. A motor control unit 22, shown enlarged in Fig. 4, and more fully described in the above noted patent, is suitably secured in place and is connected to opposite ends of the cylinder of the fluid motor by means of conduits 23. The pressure supply line 24 is connected to any suitable source of suction, such as the manifold of the vehicle engine.

Referring specifically to Figs. 2 and 3, 25 represents the selector valve of the present invention which is arranged in a position most convenient to the operator. The device comprises a housing having a base 30 and a cap 31 united as by screws 32. The base is provided with two nipples 33 and 34 which communicate through passageways 35 and 36 with ports 40 and 41, respectively, in a valve seat 42.

The cap 31 is hollow and thereby provides a valve chamber 43 in which the ring-like valve elements 45 are arranged over the ports 40, 41 for normally closing them. A rockable member 46 which may be of disk form is arranged within the chamber with a stem 51 projecting upwardly through an opening 52 in the cap 31, a knob 53 being secured to the outer end of the stem. From the underside of the member 46 depend two pins 54 each with an annular groove 55 to receive one of the valve elements or rings 45, the latter being preferably of rubber so as to enable them being slipped over the pin heads into the grooves 55. This affords a yieldable point of fulcrum or support for the rockable valve carrying member 46 and thereby provides a flexible support in which the fulcruming pin may yield during rocking of member 46. One of the pins 54 extends down into each of the ports 40 and 41, serving to hold the valve member 46 against rotation within the casing and to provide the necessary fulcrum supports when the stem 51 of the valve member is rocked in either direction when being operated. In order to prevent any binding action between the pins 54 and the walls of the engaged ports during the rocking action, it is desirable to so space the pins that the distance between their axes will be slightly greater than the spacing of the axes of the ports 40 and 41. Each of the pins 54 is provided with a flattened surface 56 thus providing for a greater clearance for the passage of air through the ports.

By simply rocking the member 46 in one direction or the other, one of the valving rings will be lifted from its seat to open the underlying port to the atmosphere. A spring 60 is arranged on top of the valve member 46 within the housing chamber 43 and has a central opening 61 to receive the valve rocking stem 51. As shown in Fig. 3, when in position, this spring bears against the upper wall of the cap and serves to press the valving rings 45 downwardly on their seats to seal the ports 40 and 41.

The motor control unit 22 shown only in fragmentary section in Fig. 4 comprises a casing 62 having two separate vacuum chambers 63 (only one of which is shown for clearness of illustration). Each of these chambers is provided with a partition wall 64 supporting a cylindrical wall which defines a chamber 65 inturn connected by conduits 23 to the fluid motor. The cylindrical wall has a seat 66 at one end and a seat 70 at the opposite end. A valve disk 71 which is mounted in an atmospheric chamber 72 is pressed against the seat 70 by means of a spring 73. This valve disk is carried by a stem 74 which has a piston-like valve 75 at its upper end and engageable with the seat. The valve 75 is so spaced with relation to the valve 71 that when the latter valve is upon its seat the valve 75 will be raised from its seat. The casing is formed with a cylinder 76 in which the valve 75 is slidably mounted and this cylinder is provided in its upper end with a sealed head 80, thereby providing a chamber 81 between it and the upper surface of the valve 75. This chamber is connected to the nipples 33 and 34 of the selector valve 25 by means of a tube 82.

Each of the chambers 63 of the control unit is in communication with the pressure supply pipe 24 through a port 84, and therefore these chambers will be normally under vacuum. Each of the chambers 65 is normally connected by means of the branch conduits 23 to the fluid motor at a respective side of the piston thereof, whereby the piston is normally suction balanced. When air is permitted to flow to either of the chambers 81 by rocking the selector valve accordingly, the valve 75 will be drawn downwardly upon its seat 66, thereby simultaneously opening the valve 71 and allowing atmospheric air to enter the chamber 65 and pass to the motor.

The selector valve is of simple but durable design and construction; its parts are readily assembled; and therefore cost of production is small. The operation is not complicated since the valve member 46 merely rocks on one pin or the other and rests upon the port sealing valve as a point of support while the companion valve ring is lifted off its port. The rocking action is against the tension of the spring 60 which latter tends to normalize the rockable member on its seat. When either of the ports are opened atmospheric air will pass through the opening 52 in the cap and exposed port through either of the nipples 33 and 34 and connecting tubes 82 to either of the elements of the control unit. Such operating in either direction will be against the tension of the spring 60, which when released will move the parts back to and maintain them in their normal positions as shown in Fig. 3.

The inventive principles herein disclosed are capable of assuming other physical embodiments and therefore it is not intended to restrict the invention by reason of the detailed description except as set forth in the appended claims.

What is claimed is:

1. A control valve having a base with spaced ports opening through a valve seat, a valve member rockable on the seat and having spaced fulcrum pins depending into said ports to operatively position the member with respect to said ports against lateral displacement, valve rings fitting over the pins and acting to maintain one port closed when the valve member is rocked to lift the companion pin with its valve ring from the other port, said valve member with the valve rings being bodily liftable from the base as a unit, a cover section cooperating with the base to form a housing for enclosing the valve member against being lifted bodily from the base, said valve member having an actuating part protruding through an opening in the cap member by which said valve member may be rocked upon the base, and spring means interposed between the valve member and the cover section and normally urging both valve rings into port sealing engagement with the base.

2. A control valve having a base with spaced ports opening through a valve seat, a valve member rockable on the seat and having spaced fulcrum pins depending into said ports to operatively position the member with respect to said ports against lateral displacement, valve rings fitting over the pins and acting to maintain one port closed when the valve member is rocked to lift the companion pin with its valve ring from the other port, said valve member with the valve rings being bodily liftable from the base as a unit, a cover section cooperating with the base to form a housing for enclosing the valve member against being lifted bodily from the base, said valve member having an actuating part protruding through an opening in the cap member by which said valve member may be rocked upon the base, and spring means interposed between the valve member and the cover section and normally urging both valve rings into port sealing engagement with the base, the distance between the pin axes being greater than the spacing of the axis of the ports to avoid binding of either fulcruming pins in its port.

3. A control valve, comprising a base formed with spaced ports encircled by valve seats, a cap secured to said base and forming therewith a chamber open to the atmosphere, a valve carrying member having oppositely arranged spaced valve rings normally closing the ports and rockable on either ring to open the other port, and spring means for maintaining said valve rings normally upon their seats.

4. A control valve, comprising a base formed with spaced ports having valve seats thereabout, a cap secured to said base and forming therewith a chamber open to the atmosphere, a valve disk arranged in the chamber and having diametrically arranged spaced valve rings on its underside engaging said seats and adapted to open one at a time by rocking movement of the valve disk on the other ring, and a manually operated stem fixed on said valve disk and extending through an enlarged opening in said cap for rocking with the disk as a rigid unit.

5. A valve comprising a base formed with spaced ports, a cap secured to said base over the ports and forming therewith a chamber open to the atmosphere, a valve member having diametrically opposed spaced valving elements on its underside closing the ports and adapted to be rocked to open one port at a time by a rocking movement of the valve member on the other valving element, a manually rockable stem fixed on said valve member and extending through an enlarged opening in said cap, and a spring leaf interposed between said valve member and said cap to press said valving elements normally in a port closing position.

6. A control valve comprising a base formed with a face having spaced ports, a valve member rockable on the face and having spaced fulcrum pins depending into said ports for being confined thereby against lateral displacement, a valve element carried by each pin of the valve member and coacting with the companion valve element for normally closing the ports, resilient means yieldably holding the valve elements in their normal port closing position, and means for manually rocking said valve member to fulcrum said valve member about either of said pins.

7. A control valve comprising a base formed with a face having spaced ports, a valve member rockable on said base and having spaced fulcrum pins loosely engaging in said ports and constituting the sole means to hold the valve member on the base against lateral displacement, each of said pins having an annular groove, a valve ring carried by each pin and disposed in the groove thereof, resilient means yieldably holding said rings normally seating over the ports to close them, and means for manually rocking said valve member against the urge of said resilient means.

8. A selector valve having a base formed with two separate vacuum ports, a cap secured to said base and forming therewith a chamber open to the atmosphere, a unitary control member having spaced valves seating over the ports with centering pins projecting beyond the valves and into the ports to be confined by the walls of the latter against lateral displacement of the control member from the base, and a spring acting on the control member yieldably to urge both valves to their seats.

9. A control valve comprising a base formed with a face having spaced ports, a valve member rockable on said base and having spaced and fixedly related fulcrum pins guidingly engaging in said ports to hold the valve member on the base against lateral displacement, each pin carrying a valve for closing a respective port, resilient means acting on the valve member to urge it toward the ports for normally holding the valves in port closing positions, and means for rocking said valve member.

EARL V. SCHAAL.

REFERENCES CITED

The following references are of record in the file of this patent:

UNITED STATES PATENTS

| Number | Name | Date |
| --- | --- | --- |
| 1,891,051 | Neese | Dec. 13, 1932 |
| 2,274,917 | Carlson | Mar. 3, 1942 |
| 2,311,465 | Parker | Feb. 16, 1943 |
| 2,334,031 | Rappl | Nov. 9, 1943 |
| 2,366,127 | Rappl | Dec. 26, 1944 |

FOREIGN PATENTS

| Number | Country | Date |
| --- | --- | --- |
| 545,222 | Great Britain | of 1942 |